(12) United States Patent
Aharon

(10) Patent No.: US 10,931,861 B2
(45) Date of Patent: Feb. 23, 2021

(54) WIDE FIELD OF VIEW PANNING CAMERA

(71) Applicant: Oren Aharon, Haifa (IL)

(72) Inventor: Oren Aharon, Haifa (IL)

(73) Assignee: Oren Aharon, Haifa (IL)

( * ) Notice: Subject to any disclaimer, the term of this patent is extended or adjusted under 35 U.S.C. 154(b) by 214 days.

(21) Appl. No.: 16/133,723

(22) Filed: Sep. 18, 2018

(65) Prior Publication Data
US 2020/0092487 A1    Mar. 19, 2020

(51) Int. Cl.
| | |
|---|---|
| *H04N 5/225* | (2006.01) |
| *H04N 5/232* | (2006.01) |
| *G02B 7/02* | (2021.01) |
| *G03B 37/02* | (2021.01) |
| *G02B 13/06* | (2006.01) |

(52) U.S. Cl.
CPC .......... *H04N 5/2259* (2013.01); *G02B 7/021* (2013.01); *G02B 13/06* (2013.01); *G03B 37/02* (2013.01); *H04N 5/2254* (2013.01); *H04N 5/23296* (2013.01); *H04N 5/23299* (2018.08)

(58) Field of Classification Search
CPC .......... H04N 5/23238; H04N 5/23296; H04N 5/349; H04N 5/2259; G01S 7/4865; G01S 17/894; G01S 7/4813; G01S 7/4815; G01S 7/4817; G03B 37/02; G02B 13/06
See application file for complete search history.

(56) References Cited

U.S. PATENT DOCUMENTS

| | | | | | |
|---|---|---|---|---|---|
| 5,063,441 | A * | 11/1991 | Lipton | ................. | H04N 5/2259 348/47 |
| 5,142,357 | A * | 8/1992 | Lipton | ................. | H04N 5/2259 348/48 |
| 5,206,503 | A * | 4/1993 | Toops | ................. | H04N 5/2259 250/227.2 |
| 6,456,327 | B1 * | 9/2002 | Tsai | ..................... | H04N 5/2254 250/208.1 |
| 6,876,383 | B1 * | 4/2005 | Beitscher | ............. | H04N 3/1587 348/218.1 |
| 7,453,517 | B2 * | 11/2008 | Fujimoto | ............. | H04N 5/2253 348/374 |
| 8,253,777 | B2 * | 8/2012 | Lin | ..................... | H04N 5/2258 348/36 |

(Continued)

FOREIGN PATENT DOCUMENTS

JP        2007306282 A  * 11/2007

*Primary Examiner* — John Villecco

(57) ABSTRACT

A method and apparatus for a panning camera using multiple lenses having a common planar image plane. An imaging device is positioned across said image plane sampling a section each time. The sampled plane is an imaging representation of a very large angular scenery and it is sampled and displayed piece by piece by the imaging device. An instantaneous image of a said section is displayed or stored by a computing device. Installation of two or more said panning camera with an offset distance in between will be the basis of fast 3D measurement of scenery around the installed cameras. As the imaging device advances across said image plane it will pass across fields of view of multiple lenses. The present invention relates to high resolution very wide field of view panning camera without moving the external camera casing. Said imaging device could be a CCD, CMOS, FLIR or other imaging camera device.

3 Claims, 6 Drawing Sheets

(56) References Cited

U.S. PATENT DOCUMENTS

| | | | | |
|---|---|---|---|---|
| 2004/0032525 | A1* | 2/2004 | Aharon | H04N 5/23212 348/350 |
| 2015/0109484 | A1* | 4/2015 | Laroia | G02B 5/005 348/240.3 |
| 2016/0306168 | A1* | 10/2016 | Singh | H04N 5/2254 |
| 2018/0188502 | A1* | 7/2018 | Shih | G02B 13/06 |

* cited by examiner

—Prior Art—

WIDE FIELD OF VIEW PANNING CAMERA

BACKGROUND OF THE INVENTION

1. Field of Invention

As applications for cameras with very wide field of view with extreme resolution have become more prevalent in areas such as autonomous cars, panoramic augmented photos, mobile phones, drones, action cameras, security, etc., there is a high demand for low cost, thin cameras with a wide field of view. In today's technologies, the wide field of view is achieved by a single lens, resulting in significant drawbacks such as poor resolution around the edges, distortion, vignetting and limited light gathering capability. Moreover, this emphasized limitations are more significant in areas such as IR or mid-IR sensors where high resolution and wide angled optical elements are very expensive. It is the purpose of our invention to offer a solution which is free of prior art's deficiencies, offering a solution based on a multiple lenses device having their image formation area laid on a single larger plane. The photosensor will be positioned along the said plane by a mechanical linear motorized stage. The present invention provides a method and system for a high-resolution, low-distortion panning camera, potentially enabling fields of view of 360 degrees. Moreover, it will potentially provide 3-D type of imaging by using two such cameras in parallel or by using the optical elements in parallel and panning will be performed over their image formation areas.

This novel art will enable various applications as mentioned above.

Not only that the proposed system will use visible sensors such as CCD, but it will integrate sensors such as FLIR (Forward Looking InfraRed)—this will greatly improve the performance of systems, enabling day or night panning of up to 360 degrees field of view. Moreover, specific embodiments will allow 3-D reconstruction over a large field of view, either by two offset separated systems working in parallel or by a time-of-flight camera with a laser in parallel, thus providing a wide field of view LIDAR systems.

The present invention is related to the field of panning optical devices, enabling wide fields of view, with high resolution per instantaneous field, wherein our technology differs by positioning an imaging device over multiple lenses which are mounted to have a mutual image plane in such a way that the external housing is stationary and the photodetector is the only moving element in an enclosed environment.

Thus a method and apparatus are disclosed for panning over wide fields of view using a technology wherein the photosensor is positioned across an imaging plane of multiple lenses.

2. Description of the Related Art

Imaging over a wide field of view usually involves a digital imager and a scanning mechanical payload which is pan/tilting the digital sensor. Those technologies are rapidly developing towards down-to-earth applications in day to day requirements, such as CCTV for security autonomous driving and aerial observation mast. Prior arts' wide field of view scanners usually involve a photosensor equipped with some optical lens, steered by an angular motor in order to achieve scanning over wide fields. This technology usually requires a high volume, weight and inertia; demands which are difficult to meet, especially in applications as described above. Moreover, these devices tend to be very expensive when high resolution is combined with FLIR type of requirements. Configurations of scanning camera layouts are difficult to implement since thermal control, exposure to environment and fast movements are very challenging.

The disclosed art overcomes most of these drawbacks by packaging a miniature photodetector equipped with a linear moving stage, which positions the detector over multiple lenses having a mutual elongated image plane. Since the detector's mass is very small and has a negligible inertia, the overall mechanics are very compact and fast speed is easily achievable. Moreover, since the lenses and housing are stationary and enclosing the said photodetector and stage, the thermal and environmental problems are eliminated. The positioning action over multiple lenses imaging plane is relatively inexpensive, and can create a 360 degree field of view with very high resolution by stitching images together. Furthermore, the instantaneous field of view is of high resolution and there are no moving external parts to the camera's enclosure.

For specific applications, there is a need for a system which observes the environment in two distinct wavelengths, for example—one in the visible range and the second in the NIR range.

In this case we can mount two detectors, each with a different spectral responsivity, on said linear motorized stage. These photodetectors move together over a single elongated image plane, sequentially positioned over the image plane of said lenses.

The measurement principles of prior art systems are:

Designing a wide field of view optical element equipped with a stationary detection system.

A scanning element wherein photodetector is equipped with a lens—the whole arrangement is rotated to achieve wide field of view and high resolution.

The disclosed art, although performing similar to said technologies, in some instances overcomes their performance (3-D sensor fusion). Furthermore, it offers a miniature design and is well protected against the elements and will be relatively inexpensive to build. Special embodiments of disclosed technology will also enable viewing large fields of view with two spectral bands or illuminating with LIDAR over same field of view.

The disclosed art will be free of prior art disadvantages by allowing simultaneous panning of wide field of views, wherein the system's housing and lenses are stationary and protected by environmental effects, allowing such applications as LIDAR, 3-D technology, FLIR and sensor fusion.

SUMMARY OF THE INVENTION

The present invention provides a method and system for a high resolution low distortion panning camera using several lenses to create its image plan. The lenses are differently oriented to each other with an angle in between and each observes a different field of view according to their relative orientation. Embodiments of the present invention utilize an optical design which creates a substantially planar image plane upon all lenses have their image laid upon. Said different orientation is achieved by orientation and by mirror element reflecting a different field of view to each lens. A linear motor shifts an imaging device across said image plane passing through the various imaging areas created by the lens. Images are obtained from the camera mounted on a planar stage to perform sequential positioning over a wide field scenery. The multiple lens optical design will greatly reduce distortion which is common in wide field of view cameras. Moreover several significant drawbacks of existing wide field of view cameras such as significant optical performance reduction at the edges is also ameliorated, greatly improving the overall system performance. Embodiments of the present invention will pan over wide fields of view up to 360 degrees creating instantaneous substantial smaller fields of view with high resolution. Embodiments of the present invention could automatically position the imaging device across a field of view, displaying a region of interest having coordinates received from an outside source.

In one embodiment of the present invention, a full field of view of up to 360 degrees is created by stitching together multiple instantaneous fields of view as created by imaging device. In yet another embodiment, two sets of lenses are used in such a way that the sets observe the same scenery in parallel. The two sets have a parallax or an offset in between, for observing the image from a slightly different direction. Image processing will allow then to perform a 3-D reconstruction using a single detector which is positioned in between the said two lens sets. A similar embodiment but with two detectors can enable creation of an image at different spectral ranges.

DETAILED DESCRIPTION OF EMBODIMENTS

Figure 1:
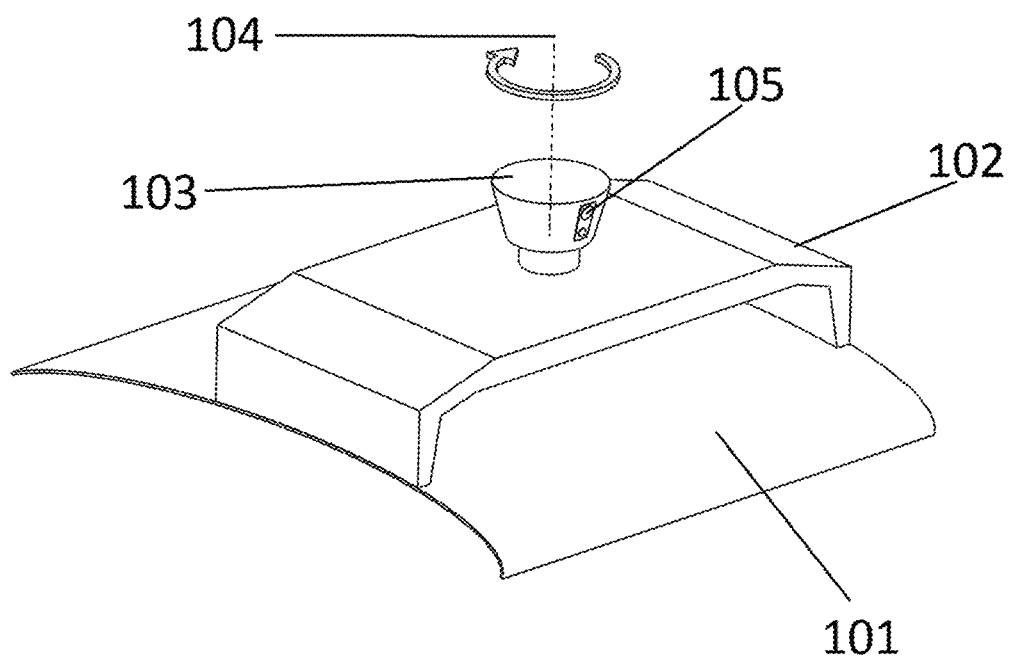
FIG. 1 illustrates an apparatus according to prior art.

Recent developments in low cost digital electronic imaging systems to process, transmit and display scenery as digital information, have substantially increased the area of applications including autonomous vehicle applications. A variety of methods for increasing the cameras field of view such as: optical turrets, mechanical scanners and wide field of view optical elements are available and have been developed to meet this demand. The very wide field of view imaging devices usually fall within two categories; the first category is stationary, where wide field of view optics are coupled with imaging sensors, such as CCD, CMOS, FLIR and photographic sensors to create a wide field of view image. The second category is based upon angular moving devices such as mirror scanners used for redirecting the line of sight and mechanical rotators for re-aiming the camera to a new field of view. Mechanical rotators or turrets will redirect the mounted camera to a different direction by electromechanical means such as motors and gears while scanning mirrors will redirect the line of sight of camera by a moving mirror with a limited angle. Stationary systems such as wide field of view optical elements are limited by the maximum field of view and optical limitation such as poor performance at the edges and limited resolution over the field of view. The growing demand for wide field of view cameras with stringent demands on mechanical layout has led to the presented innovative new art.

The disclosed wide field of view panning camera sequentially acquires various regions of interest within a designed wide field of view by several lens elements mounted on a stationary housing, each observing a different section of said wide field of view. Said lenses have share a plane wherein their image plane are placed upon. Across this shared plane, an electronic imaging device is moved by a motorized linear stage. The electronic imaging device could be compatible with various wavelengths including IR. For controlling the direction of each said lens mirrors are used, arranged in an order along the optical axis wherein a first mirror element is folding the optical axis in one direction and the second mirror element is further folding the line of sight in a different direction. In order to create multiple instantaneous images of limited fields of view and later combine it into a wide single field of view, the said imaging device is smaller than the lens' imaging plane. The said multiple instantaneous fields of view are created in correlation with the position along the image plane. For building a wide field of view with extreme resolution, a computing device could stitch said instantaneous images of fields of view into a single picture or field of view. For creating a wide field of view 3-D panning camera, the stereo camera principle is used by having two sets of several elements mounted on said stationary housing with an offset in between. A motorized linear stage will move the said electronic imaging device across said imaging plane of both lens sets. For further increasing the usability of this concept, yet another embodiment is disclosed where two detectors, rigidly attached to each other, are used to move along said imaging plane of said lens set, each detector positioned over a different lens set. First detector is preferable a time of flight camera which calculates distance by the time of flight of a pulsed laser launched from the camera set until it's back reflected by an object. The second optical element in this case will then be a pulsed laser source. The pulsed laser array rigidly attached to the time of flight camera will move in parallel the shared imaging plane. The positioning is performed by a motorized linear stage.

Other features and advantages of this invention will be made apparent upon review of the drawings and detailed description of the invention.

Present turret designs, as illustrated in FIG. 1, utilize a conventional rotational spinning motor to rotate the sensing elements and housing over 360 degrees. This type of scanner can include a digital time of flight camera and a pulsed laser mounted on a housing that scans the required angular field. Measuring distances to a target is performed by pulsed lasers; their time of flight back and forth to a target is measured and distance is derived. The said laser sources and camera are scanned across the imaging plane in increments to create a digital map of distances around the said device.

As described above, the conventional turrets are unable to provide scanning without moving the external housing in a rotational manner. They also require moving relatively heavy parts and increased electronic circuitry and mechanics. Thus, the need exists for a miniaturized line of sight shifter with no external moving parts and fast response, which is low in cost, easy to manufacture and can be easily integrated into applications such as autonomous driving.

It will be appreciated that the particular combination of features in the present application produces a non-obvious interrelationship. This application offers the effect of no external movement of housing parts, while providing effective panning, with a technology implementing multiple stationary lenses. Each said lens is oriented in a different direction, while all lenses have a mutual image plan. A miniature camera is linearly moved in between the image plane of each lens, providing a shifting of each line of sight. Additional features, such as using a time of flight camera in conjunction with a pulsed laser moved in parallel, or various spectral cameras which move at the same track, providing a unique and innovative solution.

FIG. 1 is the prior art schematic presentation which includes an example of a system mounted on a car's rooftop and scans the environment. 101 is a representation of the cars rooftop, wherein a mounting bridge denoted as 102 has a turret denoted as 103 mounted on its top. The turret rotates 360 degrees around an axis denoted 104, and by doing that the electro-optical sensors denoted as 105, which have a limited field of view, scan the full 360 degrees of the environment.

Figure 2:
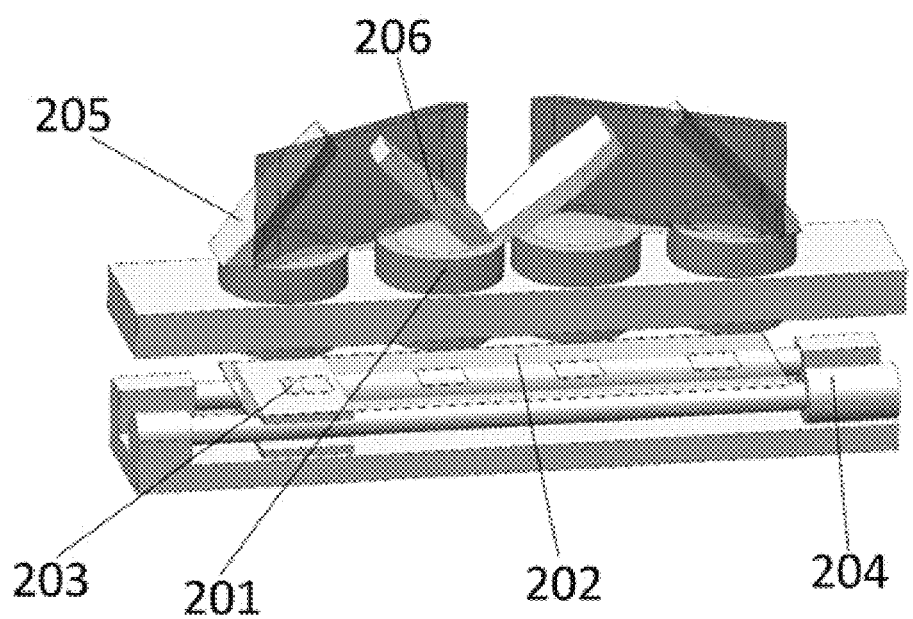
FIG. 2 illustrates the apparatus according to said embodiment of the present invention, as viewed from above.

FIG. 2 is a preferred embodiment which includes several lenses mounted in vicinity to each other and denoted as 201. Without limiting similar possible embodiments, this specific embodiment has four parallel identical lenses, each having an image plane laying on a larger plane denoted as 202. A detector denoted as 203 is positioned along said plane, activated by a linear motor denoted as 204. Each imaging detector location along said plane will translate into a momentary field of view according to its position along the plane. The optical design in this specific arrangement is such that each lens has an image plane representing about 90 degrees. By a set of mirrors, the central line of sight of each lens is redirected in such a way that the total coverage of the image planes could reach 360 degrees (4×90), however in the specific configuration displayed, the design is such that there is an overlap between the lenses in the back and in the front, and some dead areas at the sides of the camera. Since the detector could be smaller than the lenses' image plane, the momentary field of view while moving over said image plane could be smaller than 90 degrees, increasing the resolution performance of the device. Mirrors denoted as 205 will reflect the line of sight of two of said lenses towards one direction and the mirrors denoted 206 will reflect the line of sight in an opposite direction. Mirrors denoted as 305 and 306 (see FIG. 3) are double sided mirrors and redirect the said line of sights in such a way that they will be 90 degrees apart. A digital image generated by each location along said plane could be further processed by stitching technologies to provide a single image of 360 degrees.

Figure 3:
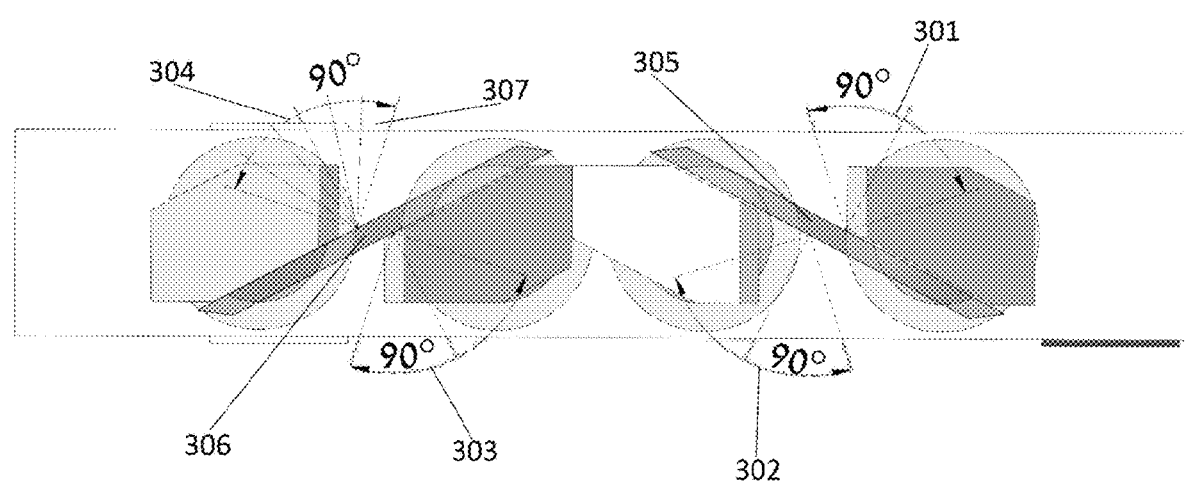
FIG. 3 illustrates the apparatus according to said embodiment of the present invention, enclosed in a protective housing.

FIG. 3 is a bird view of said camera lenses, showing the central line of sight of each camera lens and their interconnection. By design, in this specific case, which is representative of the invention but not limiting its merits, each field of view of said camera lenses is 90 degrees. First field of view, which is reflected according to the previous FIG. 2 is denoted as 301. Second field of you is denoted as 302, third field of view is denoted as 303, fourth field of view is denoted as 304. Since the mirror denoted as 305 is double sided, the 301 central line of sight is exactly opposite (180 degrees) to the 302 central line of sight, and the same holds for mirrors 306 and respective lines of sight 303 and 304. The angle between mirrors 305 and 306 is designed in such a way that the fields of view complement each other to produce up to 360 degrees field of view, in this version the design is such that in the front and back of camera there is an overlap between the fields of view. If the sensor is smaller than the image plane of view of the lens, then as it is linearly moved along the image plane, it creates a momentary field of view which is smaller than 90 degrees and denoted as 307.

Since the sensor has a small field of view, the resolution of the digitally produced image is higher when compared to a sensor covering the whole field of view.

Figure 4:
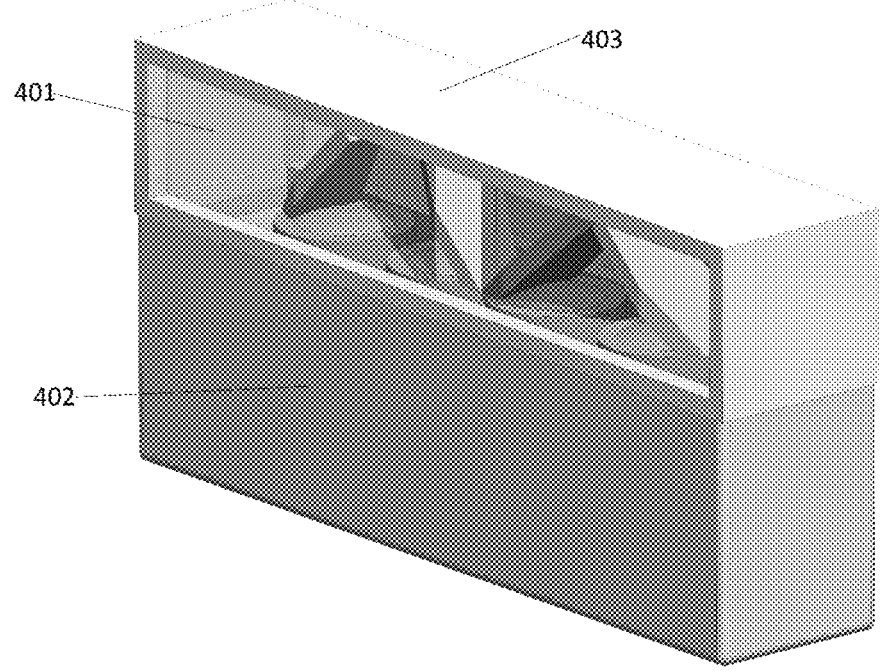
FIG. 4 illustrates yet another preferred embodiment, which combines two embodiments of the present invention with an offset in between and a single imaging sensor.

FIG. 4 shows an encapsulating enclosure of proposed invention as previously described in FIG. 2. This enclosure hermitically seals the inner parts disclosed in FIG. 2, while permitting observation of scenery by windows arrangement denoted as 401, which is transparent around its circumference. The enclosure is usually divided into two parts; the base is denoted as 402 and its upper cover with its transparent circumference is denoted as 403. This encapsulated version could potentially be used for mobile phones to replace the technology of front and back cameras with a single camera.

Figure 5:
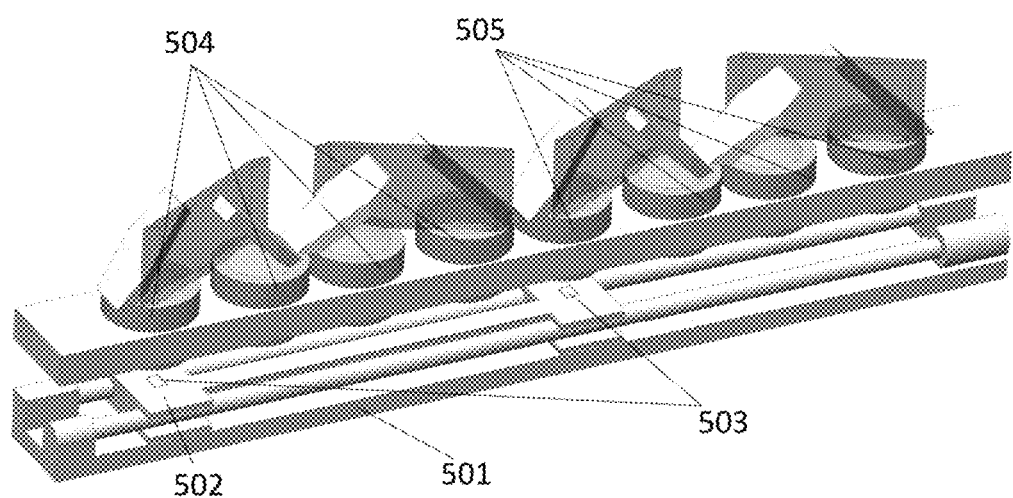
FIG. 5 illustrates yet another preferred embodiment, which combines two embodiments of the present invention with an offset in between, having at least two imaging sensors.

FIG. 5 shows yet another preferred embodiment created by positioning two sets of lenses as previously disclosed with an offset in between, having at least two imaging sensors. This offset arrangement creates a capability of 3-D imaging based on double imaging received from said two imaging sensors created by the basic stereoscopic principle similar to human 3-D perception. The linear stage denoted as 501 is at least twice as long as in a single configuration, and the moving carriage denoted as 502 is long and has on its surface two offset detectors denoted as 503. In this specific configuration, the imaging optics is built on two sets, each of four lenses denoted as 504 and 505. The fields of view of each set are parallel and in offset to create the 3-D imaging necessary in some applications.

Figure 6:
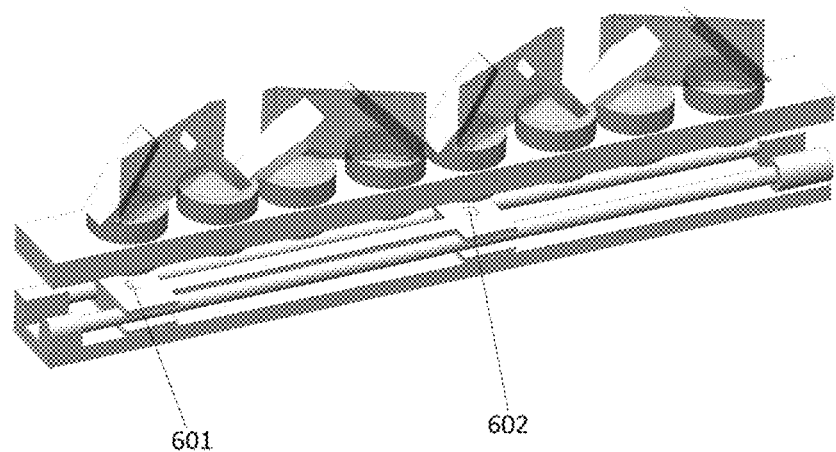
FIG. 6 illustrates yet another preferred embodiment, wherein the said imaging detectors are replaced with a time of flight camera and pulsed lasers array.

FIG. 6 shows yet another preferred embodiment which discloses a similar mechanical arrangement as disclosed in FIG. 5, wherein the said two imaging sensors are replaced with different photonics elements. In this embodiment, sensor denoted 601 is a time of flight camera which detects the flight time of each laser in the laser array denoted as 602. This arrangement is possible since the lines of sight of said time of flight camera and said pulsed lasers array are parallel since they move as one body. This will enable creation of 3-D image based on laser radar principles using the light time of flight to calculate distances between device and its surroundings.

The Detailed Description is to be understood as being illustrative and exemplary only, but not restrictive. The shown embodiments are only explanatory of the principles disclosed in the present invention and various modifications may be implemented by those skilled in the art without departing from the scope and spirit of the invention.

The invention claimed is:

1. A wide field of view 3-D camera sequentially acquiring regions of interest within the said wide field comprising:
 a set of several lens elements mounted on a stationary housing, each observing a different section of said wide field of view;
 a second set of said several lens elements mounted on said stationary housing at an offset distance;
 a plane wherein both said sets of lens elements have their image placed upon;
 at least two electronic imaging device sequentially moving across said plane; and
 a motorized linear stage to move said electronic imaging devices across the said imaging plane.

2. A wide field of view 3-D camera based on laser time of flight technology, sequentially acquiring regions of interest within the said wide field comprising:
 a set of several lens elements mounted on a stationary housing, each observing a different section of said wide field of view;

a second set of said several lens elements mounted on said stationary housing at an offset distance;

a plane wherein both said sets of lens elements have their image placed upon;

a time of flight camera moved across said first lens element; and a pulsed laser array moved across second said several lens elements rigidly attached to said time of flight camera.

3. A method for 3-D panning over a wide field of view sequentially acquiring regions of interest within the said wide field, the method comprising the steps of:

mounting a set of several lens elements on a stationary housing, each lens observing a different section of said wide field of view;

mounting a second set of said several lens elements on said stationary housing at an offset distance;

creating a plane wherein both said sets of lens elements have their image placed upon;

attaching at least two electronic imaging devices sequentially moving across said plane; and motorizing a linear stage to move said electronic imaging devices across the said imaging plane.

* * * * *